United States Patent
Ali et al.

(10) Patent No.: US 8,509,782 B2
(45) Date of Patent: Aug. 13, 2013

(54) METHODS AND APPARATUS FOR MANAGING MOBILE HANDOVER

(75) Inventors: Syed Hussain Ali, Waterloo (CA); Maiyuran Wijayanathan, Waterloo (CA); Noushad Naqvi, Waterloo (CA)

(73) Assignee: Research In Motion Limited, Waterloo (CA)

(*) Notice: Subject to any disclaimer, the term of this patent is extended or adjusted under 35 U.S.C. 154(b) by 0 days.

(21) Appl. No.: 13/529,765

(22) Filed: Jun. 21, 2012

(65) Prior Publication Data

US 2012/0258714 A1  Oct. 11, 2012

Related U.S. Application Data

(63) Continuation of application No. 12/814,150, filed on Jun. 11, 2010, now Pat. No. 8,229,436.

(60) Provisional application No. 61/186,789, filed on Jun. 12, 2009.

(51) Int. Cl.
*H04W 88/02* (2009.01)

(52) U.S. Cl.
USPC .......................................................... 455/436

(58) Field of Classification Search
USPC ................ 455/517, 436–444; 379/390, 90.9; 709/239
See application file for complete search history.

(56) References Cited

U.S. PATENT DOCUMENTS

| | | | |
|---|---|---|---|
| 7,308,263 B2 | 12/2007 | Gallagher et al. | |
| 8,229,436 B2 | 7/2012 | Ali et al. | |
| 2003/0147364 A1 | 8/2003 | Watanabe et al. | |
| 2005/0250498 A1 | 11/2005 | Lim et al. | |
| 2006/0229075 A1 | 10/2006 | Kim et al. | |
| 2007/0099561 A1 | 5/2007 | Voss | |
| 2008/0045262 A1 | 2/2008 | Phan et al. | |
| 2008/0123596 A1 | 5/2008 | Gallagher et al. | |
| 2008/0176564 A1 | 7/2008 | Eerolainen | |
| 2009/0047968 A1 | 2/2009 | Gunnarsson et al. | |
| 2009/0305668 A1 | 12/2009 | Ahn et al. | |
| 2011/0116480 A1* | 5/2011 | Li et al. | 370/332 |
| 2011/0170517 A1 | 7/2011 | Bakker et al. | |
| 2011/0183676 A1* | 7/2011 | Lee et al. | 455/438 |
| 2012/0196593 A1* | 8/2012 | Jung et al. | 455/434 |
| 2012/0208556 A1* | 8/2012 | Jung et al. | 455/456.1 |

FOREIGN PATENT DOCUMENTS

| | | |
|---|---|---|
| EP | 1746856 | 1/2007 |
| FR | 2790632 | 3/1999 |
| JP | 2003258720 | 9/2003 |
| SG | 176719 | 11/2012 |

(Continued)

OTHER PUBLICATIONS

3rd Generation Partnership Project, "3GPP TS 43.318," Technical Specification, Version 8.4.0, Mar. 20, 2009, (127 pages).

(Continued)

*Primary Examiner* — Diane Mizrahi
(74) *Attorney, Agent, or Firm* — Hanley, Flight & Zimmerman, LLC

(57) ABSTRACT

Methods and apparatus to manage mobile handover are disclosed. An example mobile station includes hardware and software stored on a tangible computer readable medium that, during operation, cause the mobile station to receive from a network controller a response to a network registration request, wherein the response includes an indicator to indicate a type of cell that may be reported by the mobile station during a handover procedure and send a handover message indicating cells permitted by the indicator.

20 Claims, 7 Drawing Sheets

(56) References Cited

FOREIGN PATENT DOCUMENTS

| WO | 0126409 | 4/2001 |
| WO | 2008020291 | 2/2008 |
| WO | 2008132163 | 11/2008 |
| WO | 2008154310 | 12/2008 |

OTHER PUBLICATIONS

3rd Generation Partnership Project, 3GPP TS 44.318, Technical Specification, Version 8.5.0, Mar. 16, 2009, (245 pages).

3rd Generation Partnership Project, "3GPP TS 45.008," Technical Specification, Version 8.2.0, Mar. 20, 2009, (137 pages).

3rd Generation Partnership Project, "3GPP TS 44.318," Technical Specification, Version 6.12.0, Jun. 13, 2008, (154 pages).

3rd Generation Partnership Project, "3GPP TS 43.318," Technical Specification, Version 6.12.0, Jun. 16, 2008, (71 pages).

European Patent Office, "European Search Report," for EP Application No. 10165701.3, Dated Sep. 14, 2010, (7 pages).

Research in Motion UK Ltd et al., GP-091436, "Cells permitted to be Reported in Handover Procedure," downloaded by European Patent Office on Jun. 9, 2010, 3GPP TDG-GERAN Meeting #43: Change Request, (8 pages).

European Patent Office, "European Search Report," issued for European Patent Application Serial No. 101065701.3, on Oct. 6, 2011 (6 pages).

United States Patent and Trademark Office, "Non-Final Office Action," issued in connection with U.S. Appl. No. 12/814,150, on Oct. 24, 2011 (9 pages).

United States Patent and Trademark Office, "Notice of Allowance," issued in connection with U.S. Appl. No. 12/814,150, on Mar. 26, 2012 (29 pages).

United States Patent and Trademark Office, "Supplemental Notice of Allowability," issued in connection with U.S. Appl. No. 12/814,150, on May 10, 2012 (5 pages).

International Searching Authority, "International Preliminary Report on Patentability and Written Opinion," issued in connection with application PCT/CA2010/000861, on Dec. 12, 2011 (6 pages).

International Searching Authority, "International Search Report and Written Opinion," issued in connection with application PCT/CA2010/000861, on Aug. 10, 2010 (10 pages).

European Patent Office, "Communication Pursuant to Article 94(3) EPC," issued in connection with application 101065701.3, on Feb. 12, 2013 (8 pages).

Japanese Patent Office, "Notice of Reasons for Rejection with English Translation," issued in connection with application No. 2012-514303, mailed on Feb. 28, 2013 (5 pages).

IP Australia, "Patent Examination Report No. 1," issued in connection with Australian Application No. 2010258041, May 9, 2013, 3 pages.

* cited by examiner

METHODS AND APPARATUS FOR MANAGING MOBILE HANDOVER

RELATED APPLICATION

This patent is a continuation of U.S. patent application Ser. No. 12/814,150, filed Jun. 11, 2010, entitled "METHODS AND APPARATUS FOR MANAGING MOBILE HANDOVER", which claims priority from U.S. Provisional Application Ser. No. 61/186,789, entitled "METHODS AND APPARATUS FOR MANAGING MOBILE HANDOVER" and filed on Jun. 12, 2009. U.S. patent application Ser. No. 12/814,150 and U.S. Provisional Application Ser. No. 61/186,789 are hereby incorporated by reference in their entirety.

FIELD OF THE DISCLOSURE

This disclosure relates generally to mobile communications and, more particularly, to methods and apparatus for managing mobile handover.

BACKGROUND

A generic access network (GAN) extends a mobile communications network by enabling mobile devices to connect to a cellular core network via an internet protocol (IP) connection, for example a network that uses radio communications protocols (such as IEEE 802.11) in unlicensed spectrum. GANs, which may also be known as unlicensed mobile access (UMA) networks, are utilized to provide network access points to mobile devices in addition to cellular access points. For example, a GAN may provide access via a WiFi access point that is connected to the mobile communications network via a public internet protocol (IP) connection such as the internet. The GAN is managed by a controller known as the GAN-C. The GAN-C manages bidirectional communication between the mobile communications network and mobile devices.

In addition to managing ongoing communications between the mobile devices and the mobile communications network, the GAN-C also manages the process of the mobile device establishing communications with the mobile communications network via a cellular access point and ending communications via the GAN (e.g., manages user equipment (UE) mobility procedures (known as Handover) between cellular and GAN networks). During handover, the mobile device measures and sends a list of available cells to the GAN-C, which responds by instructing the mobile device to connect to a particular one of the cells. The mobile device then establishes communications with the mobile communications network via the particular one of the cells. The GAN-C may select a particular one of the cells based on the capabilities of the communications network. For example, if the GAN-C can only process a handover to a second generation (2G) network and the mobile device sends both 2G networks such as global system for mobile communications (GSM), general packet radio service, enhanced data rates for global evolution (EDGE), GSM EDGE radio access network (GERAN), etc. and third generation (3G) networks such as universal mobile telecommunication system (UMTS), the GAN-C will select one of the 2G networks to handover the mobile device.

DETAILED DESCRIPTION

Figure 1:
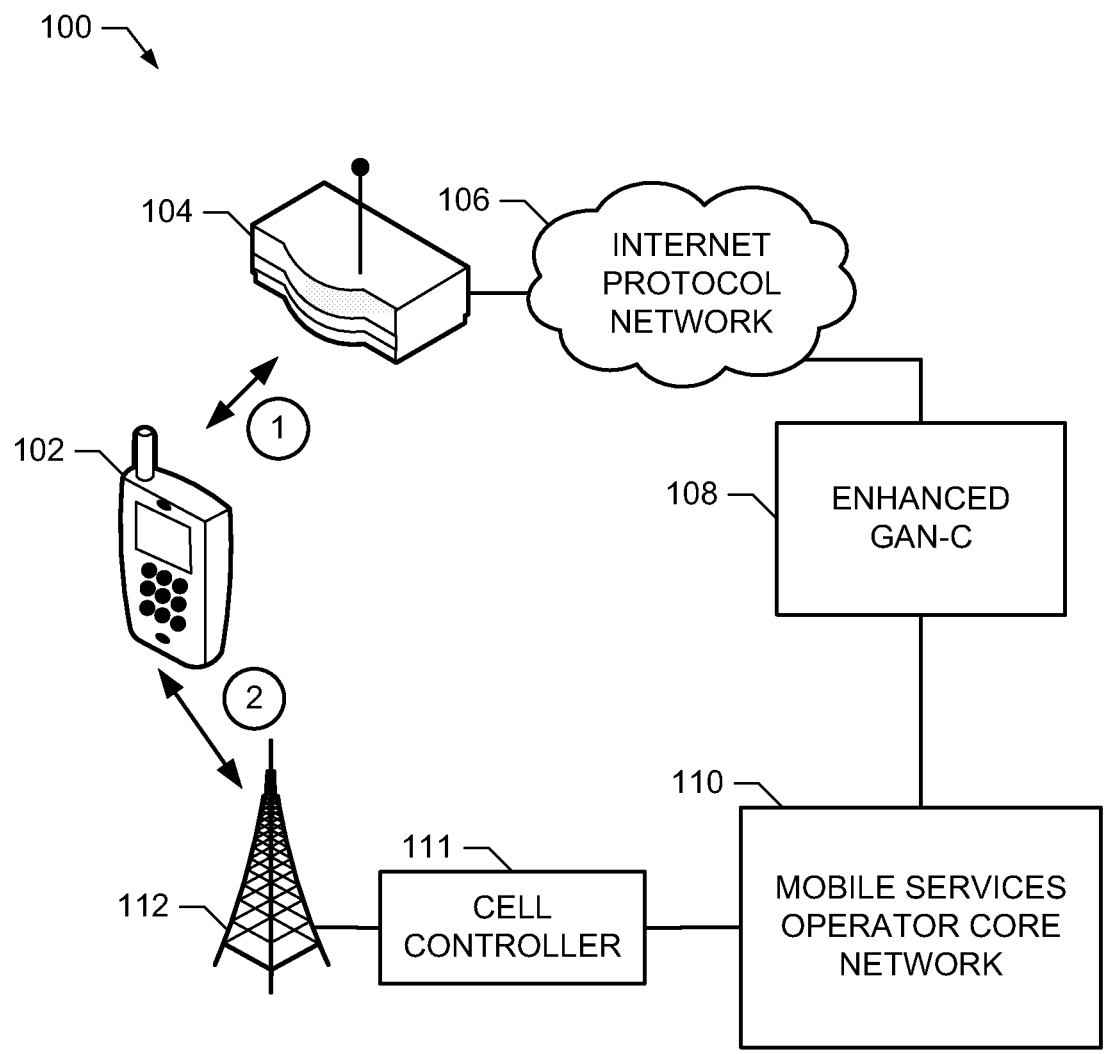
FIG. 1 is a block diagram of an example communication system that allows management of mobile handover.

Methods and apparatus for managing mobile handover are described. An example mobile station disclosed herein includes hardware and software stored on a tangible computer readable medium that, during operation, cause the mobile station to receive from a network controller a response to a network registration request, wherein the response includes an indicator to indicate a type of cell that may be reported by the mobile station during a handover procedure and send a handover message indicating cells permitted by the indicator.

In some implementations, the handover message includes a report of identities of cells to which the mobile station could be handed over. In some implementations, the handover message includes a list of candidate cell identifiers.

In some implementations of the mobile station, the handover message includes a first list of candidate cell identifiers and a second list of candidate cell identifiers. In some such implementations, the first list of candidate cell identifiers identifies third generation (3G) cells and the second list identifies second generation (2G) cells.

The indicator of the example mobile station may indicate that at least two types of cells may be reported. In some implementations, the hardware and software further cause the mobile station to measure cells of the type indicated by the indicator to generate a measurement report. In some such implementations, the handover message includes the measurement report. In some implementations of the mobile station, the handover message includes cell information for the cells permitted by the indicator. In some such implementations, the cell information includes a received signal level for the cells indicated by the indicator.

In some implementations, the indicator is a first indicator to indicate whether or not a second generation (2G) cell may be reported and wherein the response includes a second indicator to indicate whether or not a third generation (3G) cell may be reported. In some implementations, the indicator is at least one of a indication that a type of cell may be reported or an indication that a type of cell shall not be reported.

An example network equipment disclosed herein includes a cell support determiner to transmit to a mobile station a response to a network registration request, wherein the response includes an indicator to indicate a type of cell that may be reported by the mobile station during a handover procedure and receive a handover message from the mobile station indicating cells permitted by the indicator. In some implementations, the handover message includes a report of identities of cells to which the mobile station could be handed over. In some implementations, the handover message includes a list of candidate cell identifiers.

In some implementations, the handover message includes a first list of candidate cell identifiers and a second list of candidate cell identifiers. In some such implementations, the first list of candidate cell identifiers identifies third generation (3G) cells and the second list identifies second generation (2G) cells. In some implementations, the indicator indicates that at least two types of cells may be reported. In some implementations, the handover message includes a measurement report.

In some implementations, the handover message includes cell information for the cells permitted by the indicator. In some such implementations, the cell information includes a received signal level for the cells indicated by the indicator. In some implementations, the indicator is a first indicator to indicate whether or not a second generation (2G) cell may be reported and wherein the response includes a second indicator to indicate whether or not a third generation (3G) cell may be reported. In some implementations, the indicator is at least one of a indication that a type of cell may be reported or an indication that a type of cell shall not be reported.

Methods to implement the mobile station and the network equipment are also disclosed.

An example mobile station includes hardware and software stored on a tangible computer readable medium that, during operation, cause the mobile station to receive a response to a network registration request from a generic access network controller, wherein the response includes an indicator to indicate the type of radio access technologies that may be reported by the mobile station during a handover procedure and retrieve the indicator from the response. In some implementations, the hardware and software of the mobile station, during operation, further cause the mobile station to send a list of candidate cells to the generic access network controller based on the indicator.

In some implementations of the mobile station, the generic access network controller is an unlicensed mobile access controller. The radio access technologies may include at least one of a second generation radio access technology or a third generation radio access technology. In some implementations, the radio access technologies may include at least one of global system for mobile communications enhanced data rates for global evolution radio access network or universal mobile telecommunications system.

The network registration request may be a generic access resource control registration request. Additionally or alternatively, the response may be a generic access resource control registration accept message.

Another implementation of a mobile station includes hardware and software stored on a tangible computer readable medium that, during operation, cause the mobile station to receive a network registration update message from a generic access network controller, wherein the network registration update message includes an indicator to indicate the type of radio access technologies that may be reported by the mobile station during a handover procedure and retrieve the indicator from the network registration update message.

An example generic access network controller includes hardware and software stored on a tangible computer readable medium that, during operation, cause the generic access network controller to receive a generic access network registration request from a mobile station and provide a response to the generic network registration request, wherein the response includes an indicator to indicate the type of radio access technologies that may be reported by the mobile station during a handover procedure. In some implementations, the generic access network controller is an unlicensed mobile access controller. The radio access technologies may include at least one of a second generation radio access t or a third generation radio access technology.

In the example generic access network controller, the radio access technologies may include at least one of global system for mobile communications enhanced data rates for global evolution radio access network (GERAN) or universal mobile telecommunications system. In some implementations, the network registration request may be a generic access resource control registration request. In some implementations, the response is a generic access resource control registration accept message.

Another implementation of a generic access network controller includes hardware and software stored on a tangible computer readable medium that, during operation, cause the generic access network controller to receive a generic access network registration request from a mobile station and provide a generic network registration update, wherein the generic network registration update includes an indicator to indicate the type of radio access technologies that may be reported by the mobile station during a handover procedure.

Also described herein are methods, computer readable media storing instructions, and apparatus that may implement the forgoing mobile stations, processes performed by the mobile stations, generic access network controllers, and processes performed by the generic access network controllers.

FIG. 1 is a block diagram of an example communication system 100 implemented as described herein to allow management of mobile handover. According to the illustrated example, a mobile station 102 is communicatively coupled with an enhanced generic access network (GAN) controller (GAN-C) 108 via an access point 104 and an internet protocol (IP) based network 106. The enhanced GAN-C 108 couples the mobile station 102 with a mobile services operator core network 110. When the mobile station 102 registers for communication with the enhanced GAN-C 108, the enhanced GAN-C 108 sends a message indicating acceptance of the registration. As described below in detail, the message transmitted by the enhanced GAN-C 108 includes an identification of network technologies supported or preferred by the enhanced GAN-C 108. Accordingly, the mobile station 102 receives the identification sent by the enhanced GAN-C 108 and will know the network technologies supported or preferred by the enhanced GAN-C 108. Thus, when the mobile station 102 is ready to handover from the IP network 106 to another network access points such as, for example, a cell controller 111 coupled with the cell antenna 112, the mobile station 102 will know which network technologies are supported or preferred by the enhanced GAN-C 108. In a handover situation, the mobile station 102 will perform measurements of signal strength or other metrics on potential access points to which a handover may be made to assess the desirability of making the handover. Advantageously, because the GAN-C 108 provides the mobile station 102 with an identification of the network technologies supported or preferred by the enhanced GAN-C 108, the mobile station 102 will measure only access points that utilize those supported or preferred network technologies/radio access technologies (RAT). In other words, the mobile station will not need to utilize resources to measure and report access points that use network technologies that are not supported or preferred by the enhanced GAN-C 108.

The mobile station 102 may be any type of communication device that is capable of communicating with the mobile services operator via available access points (e.g., the access point 104 or the cell antenna 112. For example, the mobile station 102 may be a mobile equipment, a user equipment, etc. The example mobile station 102 may be implemented as a single unit such as a data communication device, a cellular telephone, a multiple-function communication device with data (e.g., electronic mail, internet access, personal information management, etc.) and voice communication capabilities, a personal digital assistant (PDA) enabled for wireless communication, or a computer incorporating an internal modem. Alternatively, the mobile station 102 may be a multiple-module unit comprising a plurality of separate components, including but not limited to a computer or other device connected to a wireless modem.

The example mobile station 102 includes functionality to receive a network response that includes an identification of network technologies that are supported or preferred by the enhanced GAN-C 108, which may be received, for example, as part of a registration procedure, an update procedure, etc. For example, the mobile station 102 may extract, decode, decrypt, or otherwise receive the identification that may be included with, inserted in, embedded in, or otherwise associated with the network registration response. In addition, the mobile station 102 is capable of recognizing the network technologies supported or preferred by the enhanced GAN-C 108 when scanning for available networks to which the mobile station 102 is to be handed over after a communication session with the enhanced GAN-C 108. For example, the mobile station 102 may scan for available networks, identify access points that utilize the network technolog(ies) identified by the identification, measure only those access points with the identified network technolog(ies), and report only those access points with the identified network technolog(ies) to the enhanced GAN-C 108 to request handover to one of the networks.

The access point 104 of the illustrated example may be any type of GAN access point, unlicensed mobile access (UMA) access point, home node B, femtocell, etc. For example, the access point 104 may be a Wi-Fi IEEE 802.11 access point, a worldwide interoperability for microwave access point (WiMax) IEEE 802.16 access point, a Bluetooth™ access point, etc. The access point 104 enables the mobile station 102 to connect to the mobile services operator core network 110 via the IP network 106 and the enhanced GAN-C 108. According to the illustrated example, the mobile station 102 establishes a connection with the access point 104, which connects the mobile station 102 via the IP network 106 to the enhanced GAN-C 108.

The IP network 106 of the illustrated example is the internet. In other examples, the IP network 106 may be any type of private network that communicatively couples the access point 104 to the enhanced GAN-C 108. For example, the public network may be any type of public or private local area network, wide area network, wireless network, wired network, etc.

The enhanced GAN-C 108 facilitates circuit switched (CS) and packet switched (PS) communications between the mobile station 102 and the mobile services operator core network 110. As described in further detail herein, when the mobile station 102 sends a registration request to the enhanced GAN-C 108, the enhanced GAN-C 108 sends a response to the registration request that includes an identification of network technologies/RATs supported by the enhanced GAN-C 108. For example, the enhanced GAN-C 108 may analyze network congestion (e.g., congestion of a second generation (2G) network, congestion on a third generation (3G) network, etc.), may analyze the networks supported by the enhanced GAN-C and/or the mobile services operator core network 110, etc. to determine which technologies are supported by the enhanced GAN-C 108.

The mobile services operator core network 110 is a core network that provides communication services for mobile stations such as the mobile station 102. The mobile services operator core network 110 can be communicatively coupled to the mobile station 102 via the enhanced GAN-C 108 or the access point 104 or the antenna 112. The mobile services operator core network 110 may be any type of network that provides any combination of CS and PS services for mobile stations.

The example cell antenna 112 provides a cellular access point for the mobile station 102 to access the mobile services operator core network 110. The cell antenna 112 may be a part of any type of base station or network such as, for example, a 2G network, a 3G network, a fourth generation (4G) network, a Global Systems for Mobile (GSM) technologies network, a universal mobile telecommunications system (UMTS) network, a long term evolution (LTE) network, a code division multiple access (CDMA) network, etc. The antenna 112 is connected to a base station controller (BSC), node B, or other component of the mobile services operator core network 110 to facilitate CS and PS communication services.

In an example operation, the mobile station 102 registers with the enhanced GAN-C 108 during communication represented by reference numeral 1 in FIG. 1. Also during communication 1, the enhanced GAN-C 108 sends an acceptance of the registration that includes an identification of the network technologies supported or preferred by the enhanced GAN-C 108. Later during communication 1, the mobile station 102 sends a request to the enhanced GAN-C 108 to be handed over to a cellular access point (e.g., the cell antenna 112). Because the mobile station 102 has been made aware of the capabilities of the enhanced GAN-C 108 via the registration message, the mobile station 102 does not expend resources measuring and reporting access points that use network technologies not supported or preferred by the enhanced GAN-C 108. The enhanced GAN-C 108 then instructs the mobile station 102 to initiate communication with the cell antenna 112. The mobile station 102 then initiates communication with the cell antenna in communication referred to using reference numeral 2 in FIG. 1.

Figure 2:
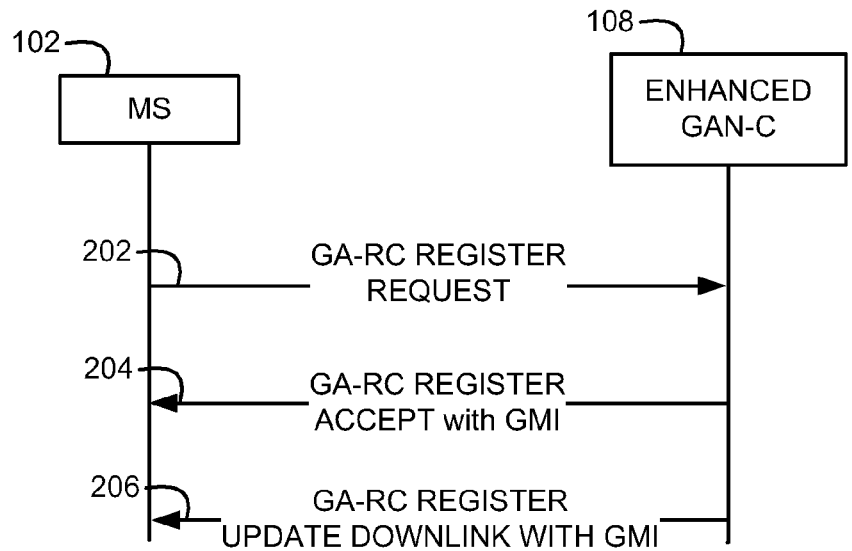
FIG. 2 is an example message flow to register a mobile station with a generic access network controller.

FIG. 2 is an example message flow that may occur during communication 1 of FIG. 1. The example message flow begins when the mobile station 102 is to initiate communication with the enhanced GAN-C 108 and the mobile services operator core network 110. The mobile station 102 sends a GA-RC REGISTER REQUEST message 202 to the enhanced GAN-C 108. For example, the GA-RC REGISTER REQUEST may be sent in accordance with 3GPP TS 44.318. Upon receipt of the GA-RC REGISTER REQUEST, the enhanced GAN-C 108 determines that the registration should be accepted and sends a GA-RC REGISTER ACCEPT message 204 to the mobile station 102. The enhanced GAN-C 108 includes a GAN mode indicator (GMI) that indicates the capabilities of the enhanced GAN-C 108 in the GA-RC REGISTER ACCEPT message 204 to indicate preferred and/or supported network technologies to the mobile station 102.

According to the illustrated example, the enhanced GAN-C 108 may determine that a change in the capabilities or preferences for network technologies has occurred after the GA-RC REGISTER ACCEPT message 204 has been sent to the mobile station 102. For example, Table 1 illustrates an example format for the GS-RC REGISTER ACCEPT message 204 that includes the GMI.

TABLE 1

Content of GA-RC REGISTER ACCEPT message with GMI

| IEI | Information Element | Type/Reference (3GPP TS 44.318) | Presence | Format | Length | Value | Notes |
|---|---|---|---|---|---|---|---|
|  | Length Indicator | Length Indicator 11.1.1.1 | M | V | 2 |  |  |
|  | GA-RC Protocol Discriminator | Protocol Discriminator 11.1.1.2 | M | V | ½ | 0000 |  |
|  | Skip Indicator | Skip Indicator 11.1.1.3 | M | V | ½ | 0000 |  |
|  | GA-RC REGISTER ACCEPT message identity | Message Type 11.1.1.4 | M | V | 1 |  |  |
| 4 | Cell Identity | Cell Identity 11.2.4 | M | TLV | 4 |  |  |
| 5 | Location Area Identification | Location Area Identification 11.2.5 | M | TLV | 7 |  |  |
| 14 | GAN Control Channel Description | GAN Control Channel Description 11.2.14 | M | TLV | 8 |  |  |
| 23 | TU3910 Timer | TU3910 Timer 11.2.23 | M | TLV | 4 |  |  |
| 22 | TU3906 Timer | TU3906 Timer 11.2.22 | M | TLV | 4 |  |  |
| 19 | GAN Band | GAN Band 11.2.19 | M | TLV | 3 |  |  |
| 37 | TU3920 Timer | TU3920 Timer 11.2.37 | M | TLV | 4 |  |  |
| 13 | GAN Cell Description | GAN Cell Description 11.2.13 | O | TLV | 4 |  |  |
| 43 | TU4001 Timer | TU4001 Timer 11.2.43 | C | TLV | 4 |  |  |
| 60 | TU4003 Timer | TU4003 Timer 11.2.60 | C | TLV | 4 |  |  |
| 44 | Location Status | Location Status 11.2.44 | O | TLV | 3 |  |  |
| 62 | GAN Service Zone Information | GAN Service Zone Information 11.2.62 | O | TLV | 5-133 |  |  |
| 67 | Serving GANC table indicator | Serving GANC table indicator 11.2.67 | O | TLV | 3 |  |  |
| 112 | TU4004 Timer | TU4004 Timer 11.2.78 | C | TLV | 3 |  |  |
| 79 | GAN Mode Indicator | GAN Mode Indicator 11.2.79 | O | TLV | 3 |  |  |
| 81 | GAN Iu Mode Cell Description | GAN Iu Mode Cell Description 11.2.81 | O | TLV | 6 |  |  |

To report the change in capabilities, the enhanced GAN-C 108 transmits a GA-RC REGISTER UPDATE DOWNLINK message 206 to the mobile station 102. The GA-RC REGISTER UPDATE DOWNLINK message 206 includes a GMI that indicates the capabilities of the enhanced GAN-C 108. For example, Table 2 illustrates an example format for the GA-RC REGISTER UPDATE DOWNLINK message 206 that includes the GMI.

TABLE 2

Content of GA-RC REGISTER UPDATE DOWNLINK message with GMI

| IEI | Information Element | Type/Reference (3GPP TS 44.318) | Presence | Format | Length | Value | Notes |
|---|---|---|---|---|---|---|---|
|  | Length Indicator | Length Indicator 11.1.1.1 | M | V | 2 |  |  |
|  | GA-RC Protocol Discriminator | Protocol Discriminator 11.1.1.2 | M | V | ½ | 0000 |  |
|  | Skip Indicator | Skip Indicator 11.1.1.3 | M | V | ½ | 0000 |  |
|  | GA-RC REGISTER UPDATE DOWNLINK message identity | Message Type 11.1.1.4 | M | V | 1 |  |  |
| 4 | Cell Identity | Cell Identity 11.2.4 | O | TLV | 4 |  |  |

TABLE 2-continued

Content of GA-RC REGISTER UPDATE DOWNLINK message with GMI

| IEI | Information Element | Type/Reference (3GPP TS 44.318) | Presence | Format | Length | Value | Notes |
|---|---|---|---|---|---|---|---|
| 5 | Location Area Identification | Location Area Identification 11.2.5 | O | TLV | 7 | | |
| 14 | GAN Control Channel Description | GAN Control Channel Description 11.2.14 | O | TLV | 8 | | |
| 23 | TU3910 Timer | TU3910 Timer 11.2.23 | O | TLV | 4 | | |
| 22 | TU3906 Timer | TU3906 Timer 11.2.22 | O | TLV | 4 | | |
| 19 | GAN Band | GAN Band 11.2.19 | O | TLV | 3 | | |
| 37 | TU3920 Timer | TU3920 Timer 11.2.37 | O | TLV | 4 | | |
| 13 | GAN Cell Description | GAN Cell Description 11.2.13 | O | TLV | 4 | | |
| 43 | TU4001 Timer | TU4001 Timer 11.2.43 | O | TLV | 4 | | |
| 60 | TU4003 Timer | TU4003 Timer 11.2.60 | O | TLV | 4 | | |
| 44 | Location Status | Location Status 11.2.44 | O | TLV | 3 | | |
| 62 | GAN Service Zone Information | GAN Service Zone Information 11.2.62 | O | TLV | 5-133 | | |
| 81 | GAN Iu Mode Cell Description | GAN Iu Mode Cell Description 11.2.81 | O | TLV | 6 | | |
| 79 | GAN Mode Indicator | GAN Mode Indicator 11.2.79 | O | TLV | 3 | | |

Table 3 illustrates an example format the GMI.

TABLE 3

GMI information element (IE)

| 8 | 7 | 6 | 5 | 4 | 3 | 2 | 1 | |
|---|---|---|---|---|---|---|---|---|
| colspan="8" | GAN Mode Indicator IEI | octet 1 |
| colspan="8" | Length of GAN Mode Indicator value contents | octet 2 |
| colspan="5" | spare | colspan="2" | HO_2G | HO_3G | Mode | octet 3 |

Table 4 illustrates an example format for the mode element of the GMI IE of Table 3.

TABLE 4

Format of the mode element of the GMI IE
Mode (octet 3, bits 1, 2)

| 0 | Reserved |
| 1 | The MS shall operate in GAN A/Gb mode |
| 2 | The MS shall operate in GAN Iu mode |
| 3 | Reserved |

In the example GMI IE of table 2, the HO_2G indication specifies whether the mobile station 102 may be handed over to a 2G cell and the HO_3G indication specifies whether the mobile station 102 may be handed over to a 3G cell. An example format for the HO_2G indication and the HO_3G indication are shown in Table 5.

TABLE 5

Format for the HO_2G indication and the HO_3G indication
HO_2G, HO_3G (octet 3, bits 3, 4)

| 0 | MS may report cells |
| 1 | MS shall not report cells |

An alternative format for the GMI IE that includes a separate value to indicate each of the capabilities of the enhanced GAN-C 108 is shown in Table 6.

TABLE 6

Example GMI IE format
GMI, GAN Mode Indicator (octet 3)

| 3 | The MS shall operate in GAN A/Gb mode and report 2G cells for handover |
| 4 | The MS shall operate in GAN A/Gb mode and report 3G cells for handover |
| 5 | The MS shall operate in GAN A/Gb mode and report 2G + 3G cells for handover |
| 6 | The MS shall operate in Iu mode and report 2G cells for handover |
| 7 | The MS shall operate in Iu mode and report 3G cells for handover |
| 8 | The MS shall operate in Iu mode and report 2G + 3G cells for handover |
| 9 to 255 | Reserved |

Figure 3:
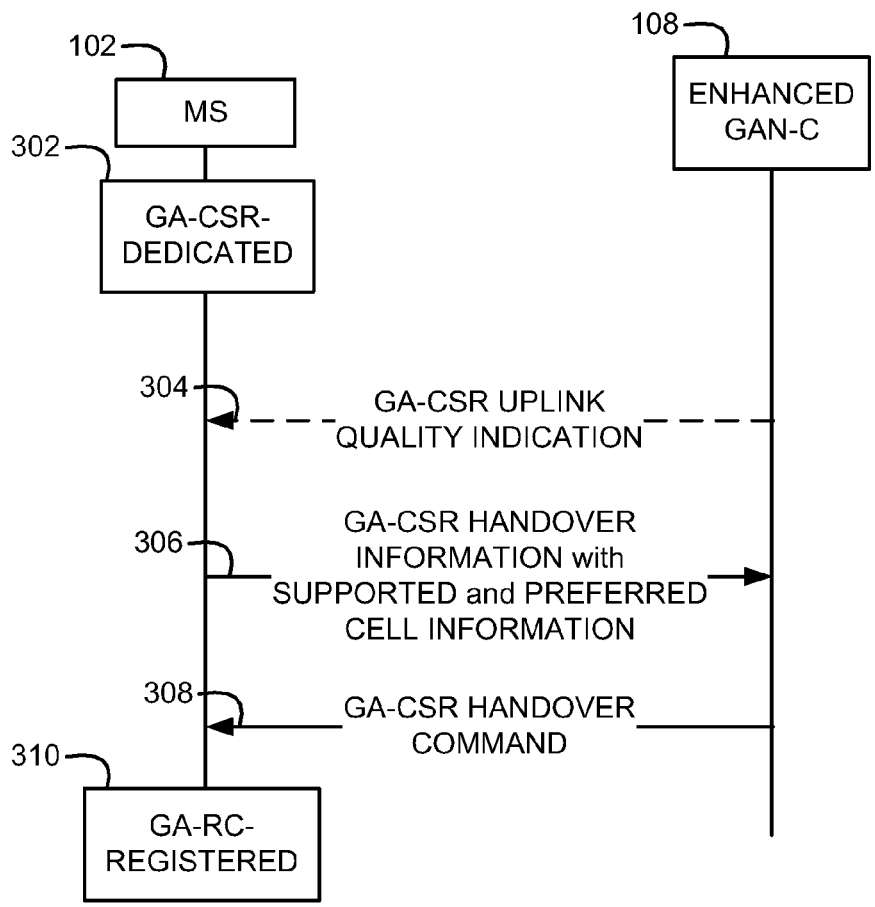
FIG. 3 is an example message flow to initiate a handover of a mobile station from a generic access network controller to a cellular network.

FIG. 3 is an example message flow that may also occur during communication 1 of FIG. 1. According to the illustrated example, the message flow of FIG. 3 takes place after the message flow of FIG. 2. At the start of the message flow of FIG. 3, the mobile station 102 is in a generic access (GA) circuit switched resources (CSR) DEDICATED state 302 (3GPP TS 43.318). In the GA-CSR-DEDICATED state 302, the mobile station 102 can initiate a handover to a cellular network (e.g., the cell antenna 112 of FIG. 1). According to the illustrated example, the mobile station 102 initiates the handover in response to the GA-CSR UPLINK QUALITY INDICATION message 304 received from the enhanced GAN-C 108 in accordance with 3GPP TS 43.318/44.318. The mobile station 102 may initiate handover for any other reason. For example, the mobile station 102 might initiate the handover due to local measurements of GAN coverage signal quality, reception of real time transport (RTP) control protocol (RTCP) packets indicating poor uplink quality, excessive loss or delay in received RTP packets, etc.

To initiate the handover, the mobile station 102 sends a GA-CSR HANDOVER INFORMATION (HI) message 306 in accordance with 3GPP TS 44.318. The GS-CSR HI message 306 includes a report of identities of cells to which the mobile station 102 could be handed over. For example, the report may identify the cells which are in the vicinity of the mobile station 102. According to the illustrated example, the mobile station 102 uses the identification of the capabilities of the enhanced GAN-C 108 received in the GA-RC REGISTER ACCEPT message 204 when determining which cells to measure and report to the enhanced GAN-C 108. The example mobile station 102 may determine that there are five cells available to the mobile station 102, but that only three of those cells meet the capabilities of the enhanced GAN-C 108. For example, the enhanced GAN-C 108 may have indicated that the mobile station 102 can only be handed over to a 2G cell and the mobile station may determine that three of the available cells are 2G cells and that the other two cells are 3G cells. Accordingly, the mobile station 102 will only measure and report the supported cells (e.g., 2G cells) in the GA-CSR HI message 306.

After receiving the GA-CSR HI message 306, the enhanced GAN-C 108 reviews the reported cells and selects a desired cell to which the mobile station 102 should be connected. Because the reported cells do not include cells that do not meet the capabilities of the enhanced GAN-C 108, the enhanced GAN-C 108 will not expend resources processing cells to which the mobile station 102 cannot be handed over. The enhanced GAN-C 108 sends a GA-CSR HANDOVER COMMAND message 308 instructing the mobile station 102 to initiate communication with the selected cell. Then mobile station 102 then enters the GA-resource control (RC)-REGISTERED state 310 in accordance with 3GPP TS 43.318. In the GA-RC-REGISTERED state 310, the mobile station 102 has been registered with the enhanced GAN-C 108 and is connected to the mobile services operator core network 110 via a cellular network (e.g., the cell antenna 112).

Figure 4:
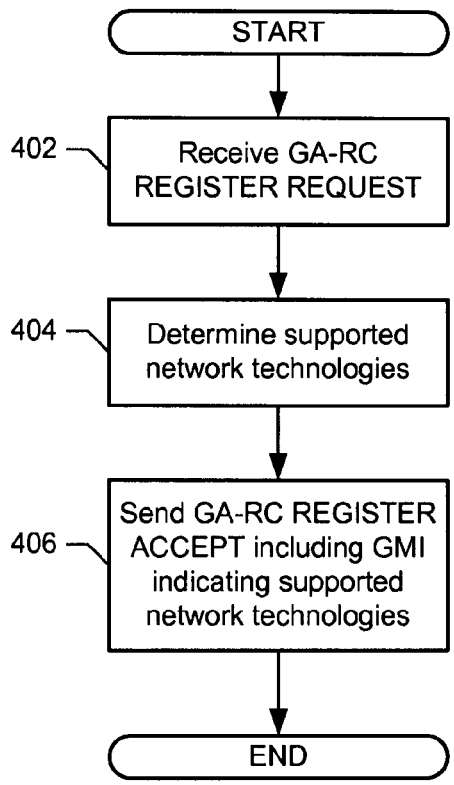
FIG. 4 is a flowchart of an example process that may be implemented by an enhanced generic access network controller.

Flowcharts representative of example processes that may be executed to implement some or all of the elements of the system 100 and mobile communication devices described herein are shown in FIGS. 3-4.

In these examples, the process represented by each flowchart may be implemented by one or more programs comprising machine readable instructions for execution by: (a) a processor, such as the microprocessor 1012 shown in the example computer 1000 discussed below in connection with FIG. 10, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 1012, but the entire program or programs and/or portions thereof could alternatively be executed by a device other than the microprocessor 1012 and/or embodied in firmware or dedicated hardware (e.g., implemented by an application specific integrated circuit (ASIC), a programmable logic device (PLD), a field programmable logic device (FPLD), discrete logic, etc.). For example, any one, some or all of the example mobile communications system components could be implemented by any combination of software, hardware, and/or firmware. Also, some or all of the processes represented by the flowcharts of FIGS. 4-5 may be implemented manually.

Further, although the example processes are described with reference to the flowcharts illustrated in FIGS. 4-5, many other techniques for implementing the example methods and apparatus described herein may alternatively be used. For example, with reference to the flowcharts illustrated in FIGS. 4-5, the order of execution of the blocks may be changed, and/or some of the blocks described may be changed, eliminated, combined, and/or subdivided into multiple blocks.

FIG. 4 is a flowchart of an example process that may be implemented by the enhanced GAN-C 108. The example flowchart of FIG. 4 begins when the enhanced GAN-C 108 receives a GA-RC REGISTER REQUEST (block 402). The enhanced GAN-C 108 then determines supported network technologies (block 404). For example, the enhanced GAN-C 108 may analyze network loads of available networks, may analyze the capabilities of the mobile services operator core network 110, may analyze any properties or characteristics of the networks connected to the enhanced GAN-C 108, or may analyze the capabilities of the GAN-C 108 to support handover to different network technologies to determine which network technologies are supported or preferred. The enhanced GAN-C 108 then sends a GA-RC REGISTER ACCEPT message to the mobile station 102 (block 406). The GA-RC REGISTER ACCEPT message includes an identification of the network technologies that are supported and/or preferred by the enhanced GAN-C 108.

Figure 5:
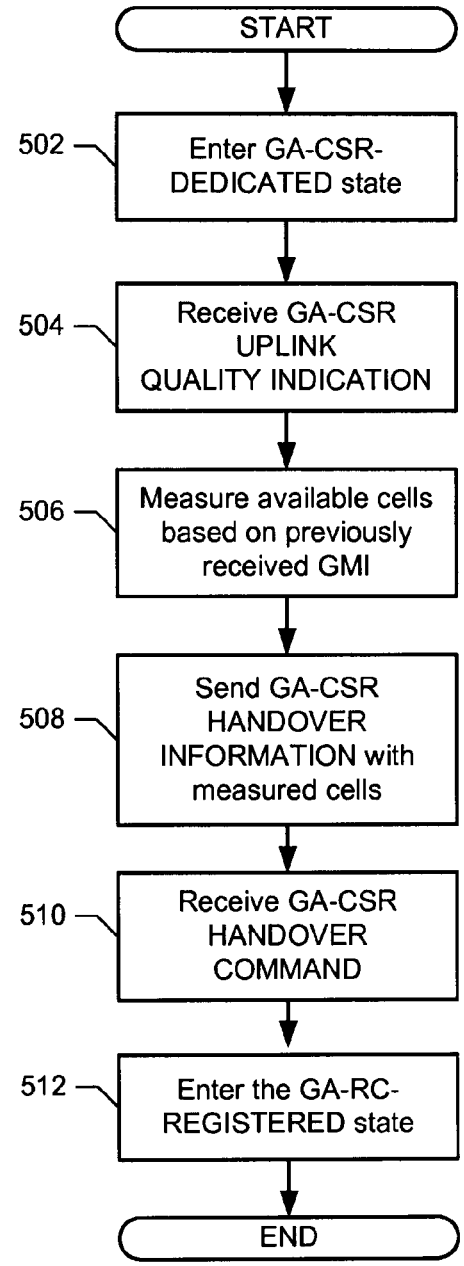
FIG. 5 is a flowchart of an example process that may be implemented by the mobile station of FIG. 1.

FIG. 5 is a flowchart of an example process that may be implemented by the mobile station 102. The process of FIG. 5 begins when the mobile station 102 has entered the GA-CSR-DEDICATED state (block 502). While not shown, the mobile station 102 may engage is CS communication during the time that the mobile station 102 is in the GA-CSR-DEDICATED state. The mobile station 102, may also enter a GA-packet switched resources (PSR)-ACTIVE state to send and receive PS data to and from the enhanced GAN-C 108. At some time, the mobile station 102 determines that a handover from the GAN to a cellular network should occur. In the illustrated example, the mobile station 102 determines that a handover should occur in response to receiving a GA-CSR UPLINK QUALITY INDICATION (block 504). The example mobile station 102 then measures available cells to which the mobile station 102 could be handed over (block 506). Because the mobile station has previously received an indication of the capabilities of the enhanced GAN-C 108, the mobile station 102 will only measure cells that meet the capabilities of the enhanced GAN-C 108. Alternatively, the mobile station 102 could measure all available cells and remove cells that do not meet that capabilities of the enhanced GAN-C 108 before reporting to the enhanced GAN-C 108.

After measuring available cells that meet the capabilities of the enhanced GAN-C 108, the mobile station 102 sends a GA-CSR HI message that includes identification of one or more of the measured cells to the enhanced GAN-C 108 (block 508). The mobile station 102 then receives a GA-CSR HANDOVER COMMAND that indicates the cell to which the mobile station 102 will be handed over (block 510). The mobile station 102 then enters the GA-RC REGISTERED state in connection with the selected cell (block 512).

Figure 6:
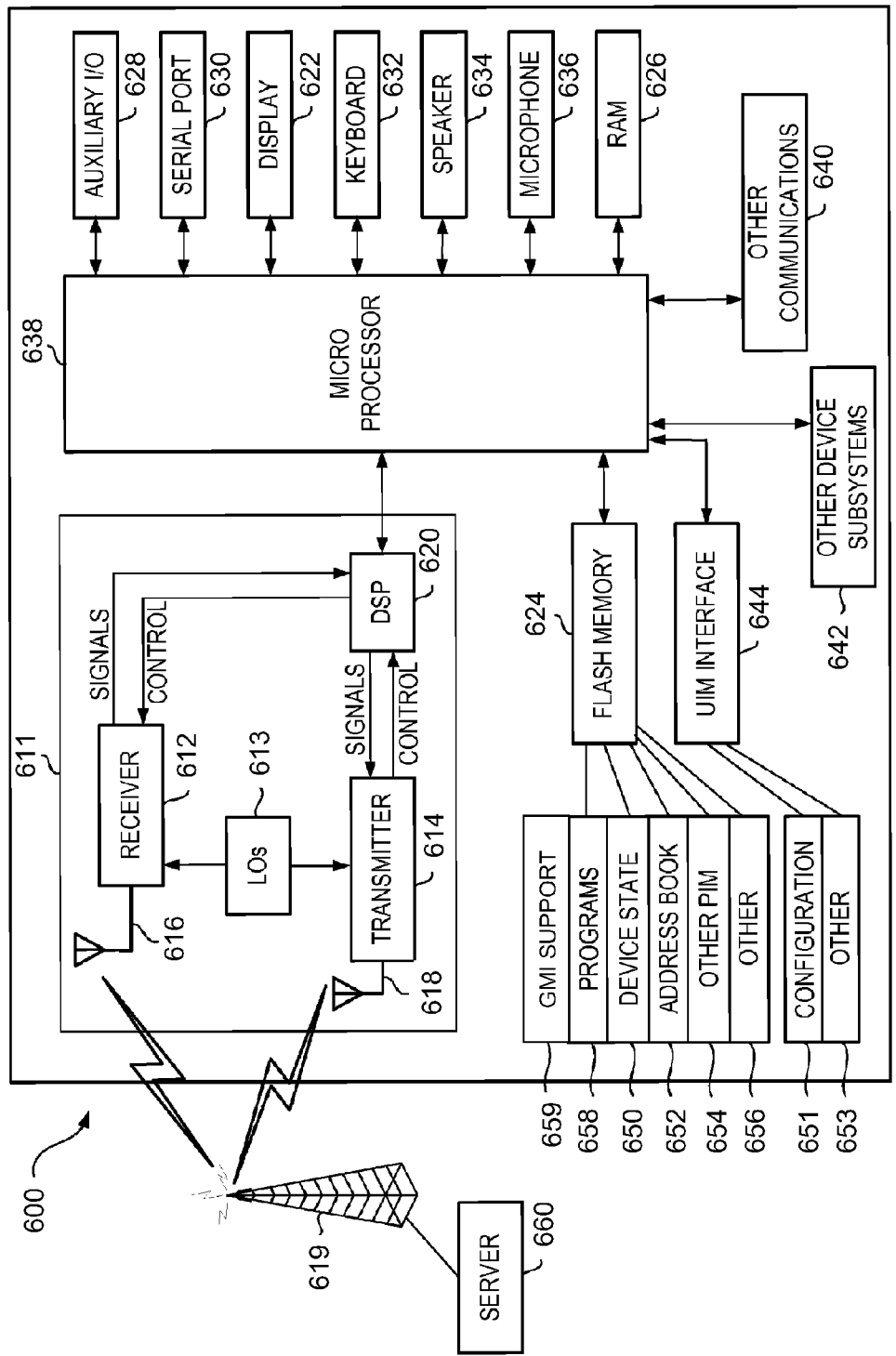
FIG. 6 is an exemplary mobile station that includes a generic access network mode indicator.

FIG. 6 is an exemplary mobile station 600 that may implement the mobile station 102 of FIG. 1. The example mobile station 600 is a two-way wireless communication device having at least voice and data communication capabilities. The example mobile station 600 has the capability to communicate with other computer systems on the Internet. Depending on the exact functionality provided, the mobile station 600 may be referred to as a data messaging device, a two-way pager, a wireless e-mail device, a cellular telephone with data messaging capabilities, a wireless Internet appliance, or a data communication device, as examples.

Where the mobile station 600 is enabled for two-way communication, it will incorporate a communication subsystem 611, including both a receiver 612 and a transmitter 614, as well as associated components such as one or more, embedded or internal, antenna elements 616 and 618, local oscillators (LOs) 613, and a processing module such as a digital signal processor (DSP) 620. As will be apparent to those skilled in the field of communications, the particular design of the communication subsystem 611 will be dependent upon the communication network in which the device is intended to operate. For example, the mobile station 600 may include a communication subsystem 611 designed to operate within one or more networks. For example, the communication subsystem 611 may operate in a GPRS network, a UMTS network, a wireless local area network, a 2G network, a 3G network, a 4G network, a Bluetooth™ network, etc. The communication subsystem 611 may be a single subsystem or may comprise multiple subsystems.

Network access requirements will also vary depending upon the type of network 619. For example, in UMTS and GPRS networks, network access is associated with a subscriber or user of the mobile station 600. For example, a GPRS mobile device uses a subscriber identity module (SIM) card in order to operate on a GPRS network. In UMTS a USIM or SIM module is used. In CDMA a RUIM card or module is used. These will be referred to as a UIM interface herein. Without a valid UIM interface, a mobile device may not be fully functional. Local or non-network communication functions, as well as legally required functions (if any) such as emergency calling, may be available, but the mobile device 600 will be unable to carry out any other functions involving communications over the network 600. The UIM interface 644 is normally similar to a card-slot into which a card can be inserted and ejected like a diskette or PCMCIA card. The UIM card can hold key configuration information 651, and other information 653 such as identification, and subscriber related information.

When network registration or activation procedures have been completed, the mobile station 600 may send and receive communication signals over the network 619. Signals received by the antenna 616 through the communication network 619 are input to the receiver 612, which may perform such common receiver functions as signal amplification, frequency down conversion, filtering, channel selection and the like and, analog to digital (A/D) conversion. A/D conversion of a received signal allows more complex communication functions such as demodulation and decoding to be performed in the DSP 620. In a similar manner, signals to be transmitted are processed, including modulation and encoding for example, by the DSP 620 and input to transmitter 614 for digital to analog conversion, frequency up conversion, filtering, amplification, and transmission over the communication network 619 via the antenna 618. The DSP 620 not only processes communication signals, but also provides for receiver and transmitter control. For example, the gains applied to the communication signals in receiver 612 and the transmitter 614 may be adaptively controlled through automatic gain control algorithms implemented in the DSP 620.

The network 619 may further communicate with multiple systems, including a server 660 and other elements (not shown). For example, the network 619 may communicate with both an enterprise system and a web client system in order to accommodate various clients with various service levels.

The mobile station 600 preferably includes a microprocessor 638 which controls the overall operation of the device. Communication functions, including at least data communications, are performed through the communication subsystem 611. The microprocessor 638 also interacts with further device subsystems such as the display 622, the flash memory 624, the random access memory (RAM) 626, auxiliary input/output (I/O) subsystems 628, a serial port 630, a keyboard 632, a speaker 634, a microphone 636, a short-range communications subsystem 640, and any other device subsystems generally designated as 642.

Some of the subsystems shown in FIG. 6 perform communication-related functions, whereas other subsystems may provide "resident" or on-device functions. Notably, some subsystems, such as the keyboard 632 and the display 622, for example, may be used for both communication-related functions, such as entering a text message for transmission over a communication network, and device-resident functions such as a calculator or task list.

Operating system software used by the microprocessor 638 is stored in a persistent store such as a flash memory 624, which may instead be a read-only memory (ROM) or similar storage element (not shown). The operating system, specific device applications, or parts thereof, may be temporarily loaded into a volatile memory such as a RAM 626. Received communication signals may also be stored in the RAM 626. Further, a unique identifier is also stored in read-only memory.

As shown, the flash memory 624 can be segregated into different areas for both computer programs 658 and program data storage 650, 652, 654, and 656. These different storage types indicate that each program can allocate a portion of the flash memory 624 for their own data storage requirements. The flash memory 624 additionally includes a GMI support module 659 for handling of GMI information elements received from a GAN network (e.g., from the enhanced GAN-C 108). The GMI support module 659 may be implemented according to the flow chart of FIG. 5 and according to the block diagram described in conjunction with FIG. 9.

The example microprocessor 638, in addition to its operating system functions, enables execution of software applications on the mobile device. A predetermined set of applications that control basic operations, including at least data and voice communication applications for example, will normally be installed on the mobile station 600 during manufacturing. An example software application may be a personal information manager (PIM) application having the ability to organize and manage data items relating to the user of the mobile device such as, but not limited to, e-mail, calendar events, voice mails, appointments, and task items. One or more memory stores would be available on the mobile device to facilitate storage of PIM data items. Such PIM application would preferably have the ability to send and receive data items, via the wireless network 619. In an example implementation, the PIM data items are seamlessly integrated, synchronized, and updated, via the wireless network 619, with the mobile device user's corresponding data items stored or associated with a host computer system. Further applications may also be loaded onto the mobile device 600 through the network 619, an auxiliary I/O subsystem 628, the serial port 630, the short-range communications subsystem 640 or any other suitable subsystem 642, and installed by a user in the RAM 626 or preferably a non-volatile store (not shown) for execution by the microprocessor 638. Such flexibility in application installation increases the functionality of the device and may provide enhanced on-device functions, communication-related functions, or both. For example, secure communication applications may enable electronic commerce functions and other such financial transactions to be performed using the mobile station 600. These applications will however, according to the above, in many cases need to be approved by a carrier.

In a data communication mode, a received signal such as a text message or web page download will be processed by the communication subsystem 611 and input to the microprocessor 638, which preferably further processes the received signal for output to the display 622, or alternatively to an auxiliary I/O device 628. A user of mobile station 600 may also compose data items such as email messages for example, using the keyboard 632, which is preferably a complete alphanumeric keyboard or telephone-type keypad, in conjunction with the display 622 and possibly the auxiliary I/O device 628. Such composed items may then be transmitted over a communication network through the communication subsystem 611.

For voice communications, overall operation of the mobile station 600 is similar, except that received signals would be output to the speaker 634 and signals for transmission would be generated by the microphone 636. Alternative voice or audio I/O subsystems, such as a voice message recording subsystem, may also be implemented on the mobile station 600. Although voice or audio signal output may be accomplished primarily through the speaker 634, the display 622 may also be used to provide an indication of the identity of a calling party, the duration of a voice call, or other voice call related information for example.

The serial port 630 in FIG. 6 may be implemented in a personal digital assistant (PDA)-type mobile device for which synchronization with a user's desktop computer (not shown) may be desirable. The serial port 630 may enable a user to set preferences through an external device or software application and would extend the capabilities of the mobile device 600 by providing for information or software downloads to the mobile station 600 other than through a wireless communication network. The alternate download path may for example be used to load an encryption key onto the device through a direct and thus reliable and trusted connection to thereby enable secure device communication.

Alternatively, the serial port 630 could be used for other communications, and could include as a universal serial bus (USB) port.

Other communications subsystems 640, such as a short-range communications subsystem, may provide for communication between the mobile station 600 and different systems or devices, which need not necessarily be similar devices. For example, the subsystem 640 may include an infrared device and associated circuits and components, a Bluetooth™ communication module to provide for communication with similarly enabled systems and devices, a WiFi communication module, a WiMax communication module, or a communication module for any other RAT.

Figure 7:
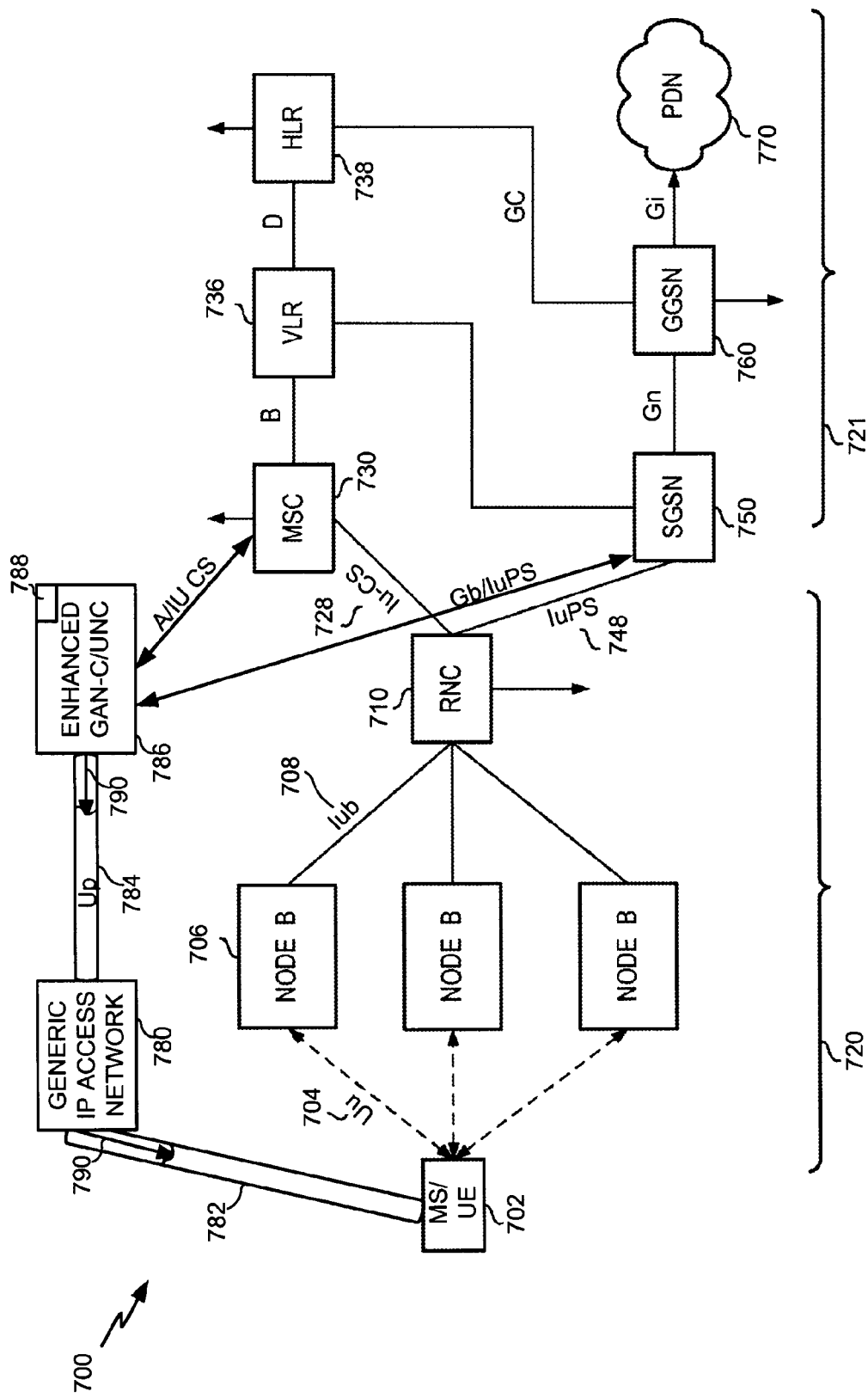
FIG. 7 is a block diagram of a communication system that includes an enhanced generic access network controller.

FIG. 7 is a block diagram of a communication system 700 which includes mobile station 702 which may implement the mobile station 102 of FIG. 1 and/or the mobile station 600 of FIG. 6. The example mobile station 702 communicates through an illustrated wireless communication network.

The mobile station 702 communicates wirelessly with one of multiple Node Bs 706 or a generic internet protocol (IP) access network 780. Each Node B 706 is responsible for air interface processing and some radio resource management functions. Node B 706 provides functionality similar to a Base Transceiver Station in a GSM/GPRS networks. The Node Bs 706 may be implemented as any type of access point for any type of network technology.

The wireless link shown in communication system 700 represents one or more different channels, typically different radio frequency (RF) channels, and associated protocols used between the wireless network and mobile station 702. A Uu air interface 704 is used between mobile station 702 and Node B 706. An RF channel is a limited resource that must be conserved, typically due to limits in overall bandwidth and a limited battery power of mobile station 702. The wireless network 700 may include one or a plurality of cells depending upon desired overall expanse of network coverage. All pertinent components may be connected by multiple switches and routers (not shown) and controlled by multiple network controllers.

Each Node B 706 communicates with a RNC 710. The RNC 710 is responsible for control of the radio resources in its area. One RNC 710 controls multiple Node Bs 706.

The interface used between Node B 706 and RNC 710 is an Iub interface 708. An NBAP (Node B application part) signaling protocol is primarily used, as defined in 3GPP TS 25.433. Universal Terrestrial Radio Access Network (UTRAN) 720 comprises the RNC 710, Node B 706 and the Uu air interface 704.

The example mobile station 702 communicates with the generic IP access network 780 via communication interface 782 as specified by the generic IP access network 780. For example, if the generic IP access network 780 is a WiFi access point, the communication interface 782 will be a WiFi interface. Any desired public or private communication interface or standard may be used including those protocols previously described.

The generic IP access network 780 connects the mobile station 702 to an enhanced GAN-C 786 via a Up interface 784. The enhanced GAN-C 786 routes CS traffic to a Mobile Switching Center (MSC) via an A/IuCS interface and routes PS traffic to a Service GPRS Support Node (SGSN) 750 via a Gb/IuPS interface. The enhanced GAN-C 786 may be any type of controller for supporting generic access networks, unlicensed mobile networks, etc. For example, the enhanced GAN-C 786 may be an unlicensed mobile network controller (UNC).

The enhanced GAN-C 786 of the illustrated example includes a GMI controller 788. The GMI controller 788 may be implemented according to the flowchart of FIG. 4 and the block diagram of FIG. 8. According to the illustrated example, the GMI controller 788 is configured to include a GMI IE in messages transmitted from the enhanced GAN-C 786 to the mobile station 102 to indicate the capabilities of the enhanced GAN-C 786. For example, in response to a registration request, the enhanced GAN-C 786 may send a registration accept message 790 that is transmitted to the mobile station 702 via the UP interface 784, the generic IP access network 780 and the communication interface 782. The GMI controller 788 includes with the registration accept message 790 (or any other desired message), an indication of the capabilities of the enhanced GAN-C 786 and/or the communication system 700.

According to the illustrated example, circuit switched traffic is routed to the MSC 730. The MSC 730 is a switch that routes the calls, and takes and receives data from the subscriber or from the PSTN (not shown). Traffic between the RNC 710 and the MSC 730 uses the Iu-CS interface 728. The Iu-CS interface 728 is the circuit-switched connection for carrying (typically) voice traffic and signaling between the UTRAN 720 and the core voice network. The main signaling protocol used is RANAP (Radio Access Network Application Part). The RANAP protocol is used in UMTS signaling between the Core Network 721, which can be the MSC 730 or the SGSN 750 (defined in more detail below) and the UTRAN 720. The RANAP protocol is set forth in 3GPP TS 25.413.

For all mobile stations 702 registered with a network operator, permanent data (such as mobile station 702 user's profile) as well as temporary data (such as the current location of mobile station 702) are stored in a home location registry (HLR) 738. In case of a voice call to mobile station 702, the HLR 738 is queried to determine the current location of mobile station 702. A Visitor Location Register (VLR) 736 of the MSC 730 is responsible for a group of location areas and stores the data of those mobile stations that are currently in its area of responsibility. This includes parts of the permanent mobile station data that have been transmitted from the HLR 738 to the VLR 736 for faster access. However, the VLR 736 of the MSC 730 may also assign and store local data, such as temporary identifications. The mobile station 702 is also authenticated on system access by the HLR 738.

Packet data is routed through the SGSN 750. The SGSN 750 is the gateway between the RNC and the core network in a GPRS/UMTS network and is responsible for the delivery of data packets from and to the mobile stations within its geographical service area. The IuPS interface 748 is used between the RNC 710 and the SGSN 750, and is the packet-switched connection for carrying (typically) data traffic and signaling between the UTRAN 720 and the core data network. The main signaling protocol used is RANAP (described above).

The SGSN 750 communicates with the Gateway GPRS Support Node (GGSN) 760 over a Gn interface. The GGSN 760 is the interface between the UMTS/GPRS network and other networks such as the Internet or private networks. The GGSN 760 is connected to a public data network PDN 770 over a Gi interface.

Figure 8:
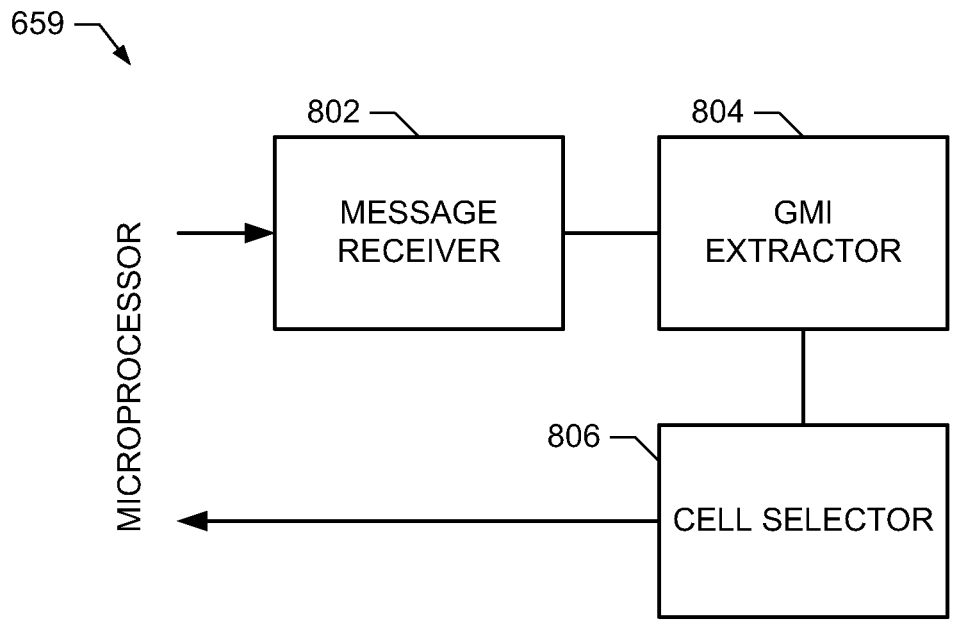
FIG. 8 is a block diagram of an example implementation of a generic access network mode indicator support module that handles generic access network mode indicator information elements included in messages received at a mobile station.

FIG. 8 is a block diagram of an example implementation of the GMI support module 659 of FIG. 6 that handles GMI IEs included in messages received at a mobile station (e.g., the mobile station 102 of FIG. 1, the mobile station 600 of FIG. 6, or the mobile station 702 of FIG. 7). The GMI support module 659 of the illustrated example includes a message receiver 802, a GMI extractor 804, and a cell selector 806. While particular blocks are described as implementing the example GMI support module 659, any number of hardware and/or software blocks may be used.

The message receiver 802 receives messages including GMI IEs received by the mobile station 600. For example, the message receiver 802 may receive GA-RC REGISTER ACCEPT messages, GA-RC REGISTER UPDATE DOWNLINK messages, etc. The message receiver 802 transmits received messages to the GMI extractor 804. For example, the message receiver 802 may receive all messages received by the mobile station 600 and may transmit a copy of the message to the GMI extractor 804 and a copy of the message to the microprocessor 638 for processing the message. Alternatively, the message receiver 802 may monitor messages received by the mobile station 600 and capture a copy of messages to transmit to the GMI extractor 804.

The GMI extractor 804 receives messages from the message receiver 802 and extracts GMI IEs included with the messages. For example, the GMI extractor 804 may decode messages, decrypt messages, extract embedded GMI IEs, read included GMI IEs, or may perform any other process to obtain the GMI IEs included with the messages. The GMI extractor 804 transmits the extracted GMI IEs to the cell selector 806.

The example cell selector 806 is communicatively coupled with the processing components of the mobile station 600 (e.g., the microprocessor 638) to allow the cell selector 806 to control which cells are measured and reported a GAN-C (e.g., the enhanced GAN-C 108) when a handover is desired. The cell selector 806 controls measurement and reporting based on the indications in a GMI IE received from the GMI extractor 804. For example, when a GMI IE indicates that a GAN-C to which the mobile station 600 is connected can only handover to a 2G network, the cell/RAT selector 806 will control the mobile station 600 to cause the mobile station 600 to only measure and report associated GAN-C 2G cells. For example, the cell selector 806 may monitor the mobile station 600 for the mobile station 600 to search for or identify available networks. The cell selector 806 can prevent the mobile station 600 from expending resources to measure and report cells to which the enhanced GAN-C cannot handover the mobile station 600. For example, the cell selector 806 can prevent the mobile station 600 from scanning for cells that are not supported.

Figure 9:
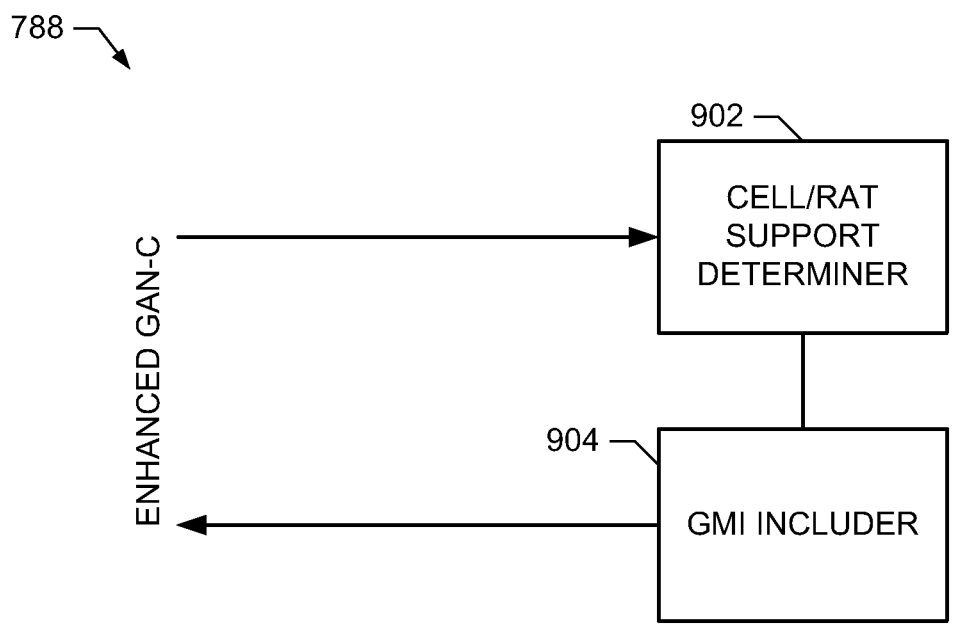
FIG. 9 is a block diagram of an example implementation of a generic access network mode indicator controller.

FIG. 9 is a block diagram of an example implementation of the GMI controller 788 of FIG. 7 that includes GMI IEs in messages transmitted by the enhanced GAN-C 786. The GMI controller 788 of the illustrated example includes a cell/RAT support determiner 902 and a GMI includer 904. While particular blocks are described as implementing the example GMI controller 788, any number of hardware and/or software blocks may be used.

The example cell/RAT support determiner 902 determines the network technology capabilities of the enhanced GAN-C 786 and its associated network. For example, the cell support determiner 902 may determine that the enhanced GAN-C 786 is associated with a network that only supports a particular network technology. Alternatively, the cell support determiner 902 may determine that network congestion for a particular network technology is too high and, thus, limit handovers to a particular network technology. In another example, the cell support determiner 902 may receive a user input that indicates the network technologies that are supported or desired for use. Any process for determining network technologies supported or otherwise desired by the enhanced GAN-C 786 may be used. The cell support determiner 902 sends information about the supported network technologies to the GMI includer 904.

The example GMI includer 904 receives information about the support or capabilities of the enhanced GAN-C 786 and includes an indication of the support or capabilities in messages transmitted from the enhanced GAN-C 786 to a mobile station 702. For example, the GMI includer 904 may add a GMI IE to transmitted messages such as, for example, a GA-RC REGISTER ACCEPT message, a GA-RC REGISTER UPDATE DOWNLINK message, etc. The example GMI includer 904 may monitor the operations of the enhanced GAN-C 786 to determine when to include the GMI IE in messages. Alternatively, the GMI includer 904 may be implemented in association with a message transmitter of the enhanced GAN-C 786 to include GMI IEs with messages as they are transmitted. Alternatively, any implementation that allows the GMI includer 904 to include GMI IE information with messages may be used. The GMI includer 904 may include GMI IE information in messages in any manner. For example, the GMI IE or any other type of indication of the capabilities of the enhanced GAN-C 786 may be inserted in messages, embedded in messages, attached to messages, associated with messages, transmitted in conjunction with messages, or otherwise included with messages. Accordingly, the GMI includer 904 enables the GMI controller 788 to indicate the capabilities of the enhanced GAN-C 786 to the mobile station 702.

Figure 10:
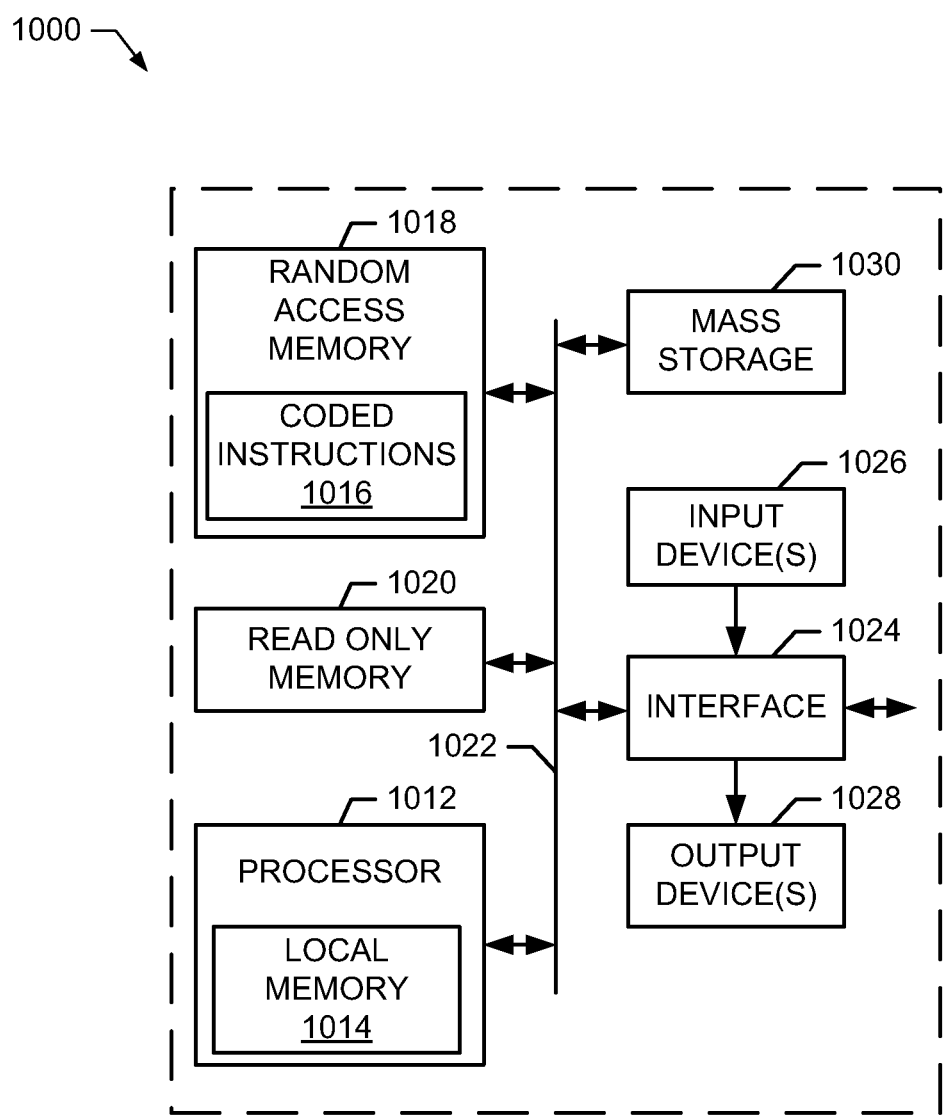
FIG. 10 is a block diagram of an example processing system capable of implementing the apparatus and methods disclosed herein.

FIG. 10 is a block diagram of an example processing system 1000 capable of implementing the apparatus and methods disclosed herein. The processing system 1000 can correspond to, for example, a mobile station processing platform, a network element processing platform, a server, a personal computer, a personal digital assistant (PDA), an Internet appliance, a mobile phone, or any other type of computing device. For example the processing system 1000 may implement the mobile station 102, the enhanced GAN-C 108, or any other component described herein.

The system 1000 of the instant example includes a processor 1012 such as a general purpose programmable processor, an embedded processor, a microcontroller, etc. The processor 1012 includes a local memory 1014, and executes coded instructions 1016 present in the local memory 1014 and/or in another memory device. The processor 1012 may execute, among other things, machine readable instructions to implement the processes represented in FIGS. 4-5. The processor 1012 may be any type of processing unit, such as one or more microprocessors from the Intel® Centrino® family of microprocessors, the Intel® Pentium® family of microprocessors, the Intel® Itanium® family of microprocessors, and/or the Intel® XScale® family of processors, one or more microcontrollers from the ARM® family of microcontrollers, the PIC® family of microcontrollers, etc. Of course, other processors from other families are also appropriate.

The processor 1012 is in communication with a main memory including a volatile memory 1018 and a non-volatile memory 1020 via a bus 1022. The volatile memory 1018 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1020 may be implemented by flash memory and/or any other desired type of memory device. Access to the main memory 1018, 1020 is typically controlled by a memory controller (not shown).

The computer 1000 also includes an interface circuit 1024. The interface circuit 1024 may be implemented by any type of interface standard, such as an Ethernet interface, a universal serial bus (USB), and/or a third generation input/output (3GIO) interface.

One or more input devices 1026 are connected to the interface circuit 1024. The input device(s) 1026 permit a user to enter data and commands into the processor 1012. The input device(s) can be implemented by, for example, a keyboard, a mouse, a touchscreen, a track-pad, a trackball, an isopoint and/or a voice recognition system.

One or more output devices 1028 are also connected to the interface circuit 1024. The output devices 1028 can be implemented, for example, by display devices (e.g., a liquid crystal display, a cathode ray tube display (CRT)), by a printer and/or by speakers. The interface circuit 1024, thus, typically includes a graphics driver card.

The interface circuit 1024 also includes a communication device such as a modem or network interface card to facilitate exchange of data with external computers via a network (e.g., an Ethernet connection, a digital subscriber line (DSL), a telephone line, coaxial cable, a cellular telephone system such as an EGPRS-compliant system, etc.).

The computer 1000 also includes one or more mass storage devices 1030 for storing software and data. Examples of such mass storage devices 1030 include floppy disk drives, hard drive disks, compact disk drives, and digital versatile disk (DVD) drives.

As an alternative to implementing the methods and/or apparatus described herein in a system such as the device of FIG. 10, the methods and or apparatus described herein may be embedded in a structure such as a processor and/or an ASIC (application specific integrated circuit).

Finally, although certain example methods, apparatus and articles of manufacture have been described herein, the scope of coverage of this disclosure is not limited thereto. On the contrary, this disclosure covers all methods, apparatus and articles of manufacture fairly falling within the scope of the appended claims either literally or under the doctrine of equivalents.

What is claimed is:

1. A method for a mobile station, the method comprising:
receiving from a network controller a response to a network registration request, wherein the response includes an indicator to indicate a type of cell that shall not be reported by the mobile station during a handover procedure; and
sending a handover message indicating cells permitted by the indicator.

2. A method as defined in claim 1, wherein the handover message includes a report of identities of cells to which the mobile station could be handed over.

3. A method as defined in claim 1, wherein the handover message includes a list of candidate cell identifiers.

4. A method as defined in claim 3, wherein the response is an ACCEPT message.

5. A method as defined in claim 4, wherein the handover message includes a second list of candidate cell identifiers that identifies an additional type of cells.

6. A method as defined in claim 1, wherein the indicator indicates that at least two types of cells may be reported.

7. A method as defined in claim 1, further comprising measuring cells of the type indicated by the indicator and generate a measurement report.

8. A method as defined in claim 7, wherein the handover message includes the measurement report.

9. A method as defined in claim 1, wherein the handover message includes cell information for the cells of the type indicated by the indicator.

10. A method as defined in claim 9, wherein the cell information includes a received signal level for the cells of the type indicated by the indicator.

11. A method as defined in claim 1, wherein network registration request is a generic access network registration request.

12. A method as defined in claim 1, wherein the response includes a second indicator that indicates at least one of a second type of cell may be reported or the second type of cell shall not be reported.

13. A mobile station including hardware and software stored on a tangible computer readable medium that, during operation, cause the mobile station:
receive from a network controller a response to a network registration request, wherein the response includes an indicator to indicate a type of cell that shall not be reported by the mobile station during a handover procedure; and
send a handover message indicating cells permitted by the indicator.

14. A mobile station as defined in claim 13, wherein the handover message includes a report of identities of cells to which the mobile station could be handed over.

15. A mobile station as defined in claim 13, wherein the handover message includes a list of candidate cell identifiers.

16. A mobile station as defined in claim 15, wherein the response is an ACCEPT message.

17. A mobile station as defined in claim 16, wherein the handover message includes a second list of candidate cell identifiers that identifies an additional type of cells.

18. A network equipment comprising:
- a cell support determiner to transmit to a mobile station a response to a network registration request, wherein the response includes an indicator to indicate a type of cell that shall not be reported by the mobile station during a handover procedure; and
- a component to receive a handover message from the mobile station indicating cells permitted by the indicator.

19. A network equipment as defined in claim 18, wherein the handover message includes a report of identities of cells to which the mobile station could be handed over.

20. A network equipment as defined in claim 18, wherein the handover message includes a list of candidate cell identifiers.

* * * * *